R. A. PATRICK.
MACHINE FOR GENERATING THE PITCH OF PROPELLER BLADES.
APPLICATION FILED DEC. 29, 1916.

1,254,063.

Patented Jan. 22, 1918.

2 SHEETS—SHEET 1.

Inventor
Robert A. Patrick,
By his Attorneys

R. A. PATRICK.
MACHINE FOR GENERATING THE PITCH OF PROPELLER BLADES.
APPLICATION FILED DEC. 29, 1916.
1,254,063.
Patented Jan. 22, 1918.
2 SHEETS—SHEET 2.
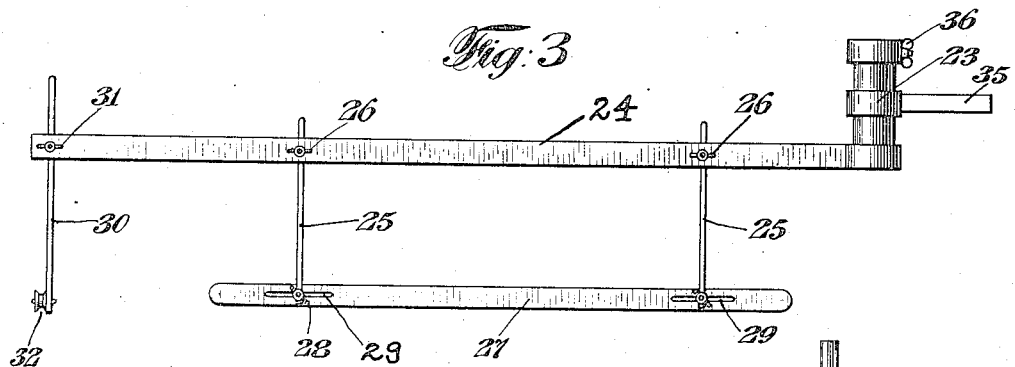
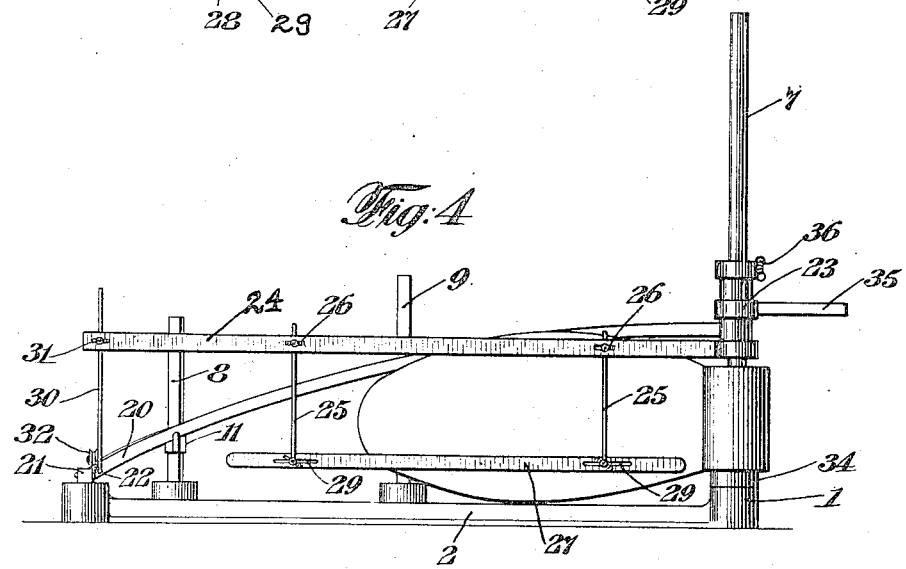
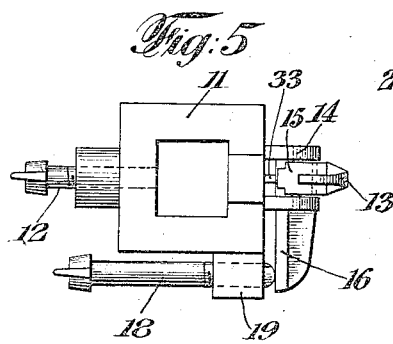
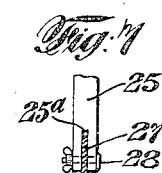
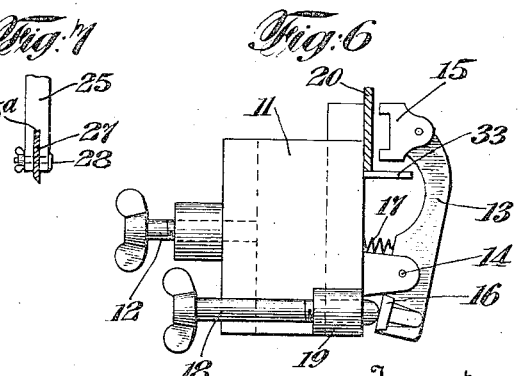
Inventor
Robert A. Patrick,
By his Attorneys

UNITED STATES PATENT OFFICE.

ROBERT A. PATRICK, OF FREEPORT, NEW YORK, ASSIGNOR TO COLUMBIAN BRONZE CORPORATION, OF FREEPORT, LONG ISLAND, NEW YORK, A CORPORATION OF NEW YORK.

MACHINE FOR GENERATING THE PITCH OF PROPELLER-BLADES.

1,254,063.   Specification of Letters Patent.   Patented Jan. 22, 1918.

Application filed December 29, 1916. Serial No. 139,697.

*To all whom it may concern:*

Be it known that I, ROBERT A. PATRICK, a subject of the King of Great Britain, and a citizen of Canada, residing at Freeport, county of Nassau, and State of New York, have invented certain new and useful Improvements in Machines for Generating the Pitch of Propeller-Blades, of which the following is a specification.

This invention relates to machines for generating the pitch of propeller blade patterns, or for determining the pitch of a finished pattern or propeller blade.

The main object of the invention is the provision of simple mechanism for quickly testing the pitch of propeller blade patterns during the manufacture thereof, and for readily ascertaining the pitch of the blades of a finished propeller or pattern.

A further object of the invention is the provision of testing means adjustable for use in connection with blade patterns or propeller blades having different pitches and lateral inclinations.

Another important object is the provision of a testing or gage member movable back and forth over the surface of the pattern or blade, and a relatively fixed gage member coöperating to automatically indicate when the pattern has been made to conform to the desired standard.

Figure 1:
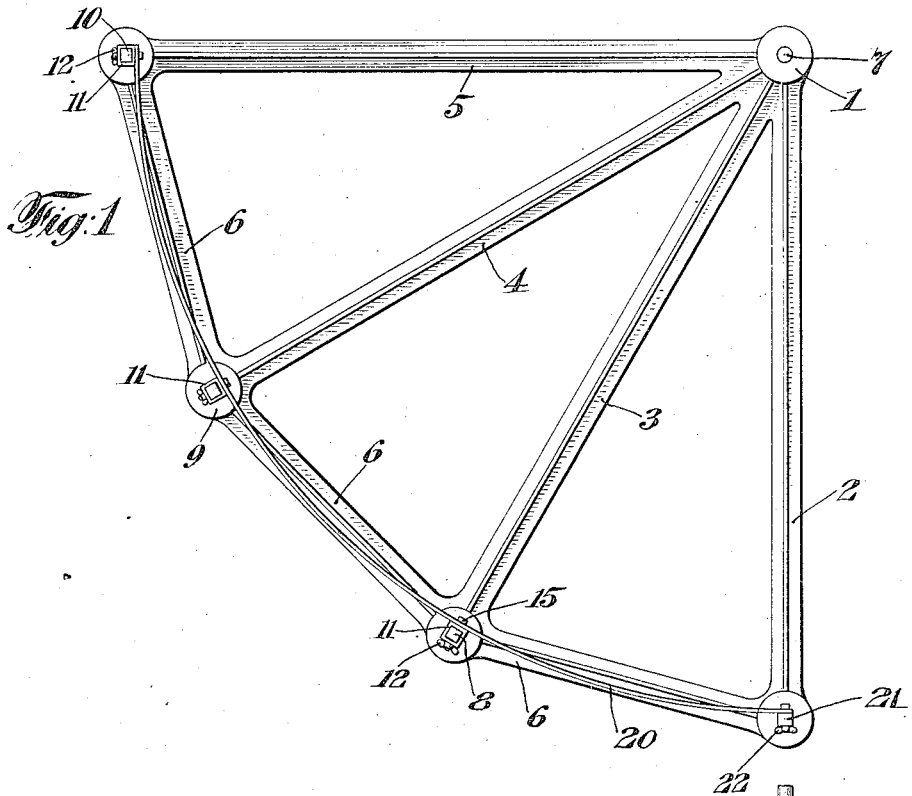
Figure 2:
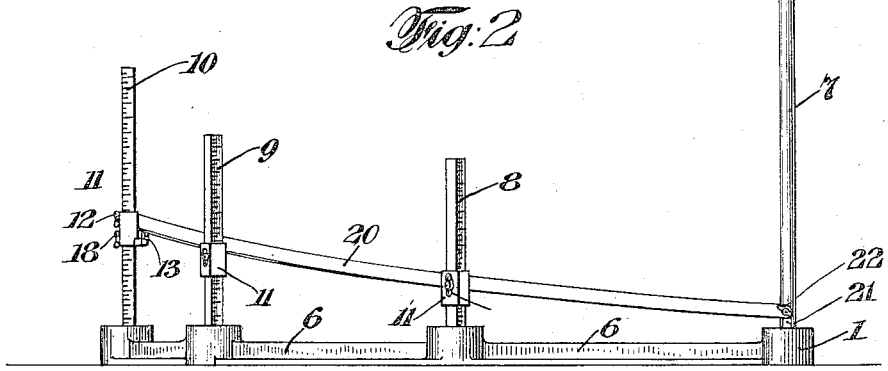

In the drawings, Figure 1 is a plan view of the apparatus, the swinging testing member being removed;

Fig. 2 is a side elevation, with the swinging testing member removed;

Fig. 3 a detail side elevation of the swinging testing member;

Fig. 4 a side elevation showing the apparatus ready for use;

Fig. 5 a detail plan view of one of the adjustable supports for the track;

Fig. 6 a detail side elevation of one of the adjustable supports; and

Fig. 7 a detail view showing the manner of securing the testing blade to its supports.

Referring to the various parts by numerals, the base of the apparatus comprises a hub or pivot portion 1 from which extends a plurality of radial arms 2, 3, 4 and 5, of equal length, the outer ends of which are connected by an arc-shaped bar 6. The arms 2, 5 and 6 are of such length as to form a quadrant of a circle having the hub 1 as an axis.

Fixed in a socket in the hub 1 is a vertically extending pivot post 7. Vertically extending posts 8, 9 and 10 are mounted at the points of intersection of arms 3, 4 and 5 with the arc-shaped bar 6. The posts 8, 9 and 10 are preferably rectangular in cross section, and are fixed in sockets formed at the points of intersection of the arms, or otherwise rigidly affixed to the base.

Said posts 8, 9 and 10 are preferably of different heights, post 10 being the highest, post 9 being substantially two-thirds the height of post 10, and post 8 being one-third the height of post 10. The posts 8, 9 and 10 are provided with graduations on one side thereof, post 10 being graduated in inches and fractions thereof. The scale of the graduations on post 9 is preferably two-thirds of the scale of the graduations on post 10, and the scale of the graduations on post 8 is preferably one-third of the scale of graduations on post 10. A slide 11 is mounted on each post 8, 9 and 10, and said slides are provided with clamping screws 12 for securing the slides in their adjusted positions on the posts. A lever 13 is pivotally mounted, intermediate its ends, on the inner side of each slide 11, as shown at 14 in Figs. 5 and 6. The lever 13 is provided with a clamping jaw 15 at its upper end, and with a laterally extending arm or lug 16 at its lower end. A spring 17 normally forces the upper end of lever 13 and the clamping jaw 15 away from the slide 11. A screw 18 threaded through a laterally projecting lug 19 adjacent the lower end of the slide, is adapted to bear against lug 16 on the lever and force the clamping jaw 15 against the inner wall of the slide.

A curved track 20, preferably formed of spring steel, is pivotally connected, at one end, with a short post or projection 21 at the intersection of arms 2 and 6, by a horizontal pivot pin or bolt 22. The opposite end of the track or guide 20 is free and extends a suitable distance beyond post 10. It will be obvious that by adjusting slides 11 proportionately on posts 8, 9 and 10, and clamping said track to the slides by means of the jaws 15, with the lower edge of the track resting on pins 33, projecting from the slides 11, a track having any desired degree of pitch within the capacity of the apparatus may be formed. The upper edge of the track projects above the top of the slides, as shown in Fig. 6. The proper adjustment of the slides on the intermediate posts 8 and 9 is facilitated by providing said posts with graduations on a scale proportionate to the distance between said posts and the end posts 10 and 21, as heretofore described.

The propeller or propeller pattern to be tested is supported on the base with the post 7 passing through the hub thereof, and the blade to be tested extending over the base with its lower forward edge adjacent arm 2 of the base, as shown in Fig. 4. Suitable spacing washers 34 are dropped on post 7 to build up a support for the propeller hub suitable for the particular pattern or propeller being tested.

The vertically slidable and laterally swinging testing member is then mounted on the post 7 above the propeller or pattern. The swinging testing member comprises a hub 23 slidably and rotatably mounted on post 7, and a horizontal arm 24, secured at its inner end to said hub 23 and adapted to be swung back and forth with the shaft 7 as a pivot. The hub 23 is provided with a suitable handle 35. Intermediate the ends of the arm 24 said arm is provided with vertically disposed apertures through which the upper ends of two vertical rods 25 extend. The rods 25 are independently adjustable vertically, through the arm 24, and are secured in their adjusted positions by means of clamping bolts 26. The lower ends of the rods 25 are vertically slotted at 25ª, as shown in Fig. 7, and a gage plate 27 is clamped in said slots by means of bolts 28 extending through said rods and through slots 29 in the blade or plate 27. The pivotal connections between the plate 27 and rods 25 permit adjustment of the rods to hold the plate or blade in an inclined position, and the slots 29 permit lateral adjustment of the blade. A vertical rod 30 is adjustably held in an aperture adjacent the free outer end of arm 24, by means of a clamping bolt 31. A horizontally disposed grooved roller 32 is mounted at the lower end of rod 30 and adapted to engage and run upon the upper edge of the curved inclined track 20 when the gage plate 27 is moved across the surface of a pattern or propeller blade having a pitch corresponding to the pitch for which the track 20 is set or adjusted. Hub 23 is preferably provided with a clamping screw 36 adapted to be threaded into engagement with post 7 to lock the swinging testing member in elevated position when desired.

When the apparatus is used for testing partially finished blade patterns, the pattern is mounted in the frame with post 7 extending through the hub portion thereof and the blade portion extending over the quadrantal base with the higher edge of the blade adjacent post 10 and the lower edge extending toward post 21. The swinging gage member is then mounted on the post with the plate 27 preferably engaging the higher edge of the blade, and the gage member swung about its pivot to cause the plate 27 to ride down the inclined face of the blade pattern. If the pattern has the proper pitch the roller 32 will engage the track and plate 27 will engage the surface of the pattern throughout the movement of the gage member over the pattern. If plate 27 engages a portion of the blade surface having too low a pitch, the roller is lifted from the track and thereby indicates that the pitch is insufficient, and the degree of such insufficiency, and if the plate 27 fails to engage the pattern surface it indicates that the pitch is excessive, and the degree of excess.

It will be obvious that the apparatus is adapted for use to ascertain the pitch of a finished propeller. To ascertain the pitch of the blades of a propeller, the propeller is mounted on shaft 7 and track 20 adjusted until roller 32 and plate 27 engage the track and blade respectively throughout the movement of the plate 27 across the blade. The pitch will then be indicated on the graduations on post 10 by the position of the slide 11 thereon.

The independent adjustment of rods 25 permits the gage plate 27 to be adjusted to an inclined position for use in connection with blade patterns or blades having a lateral inclination or dip. The longitudinal adjustment of plate 27 permits adjustment of the plate when used in connection with propellers or patterns having hubs of different diameters.

What I claim is:

1. In an apparatus of the class set forth, the combination of a base comprising a hub portion and a plurality of radially extending arms of equal length, a vertical pivot post mounted in the hub portion, vertical standards mounted at the outer ends of said radial arms, a track curved on an arc the center of which is coincident with the vertical pivot post, adjustable track-supporting means mounted on the posts at the ends of said radial arms for varying the degree of inclination of the track, a gage member slidably and pivotally mounted on the vertical pivot post, and means carried by the free end of said member and adapted to engage said track to limit the downward movement of the gage member.

2. In an apparatus of the class set forth, the combination of a base comprising a hub portion and a plurality of radially extending arms of equal length, a vertical pivot post mounted in the hub portion, vertical standards mounted at the outer ends of said radial arms, a track curved on an arc the center of which is coincident with the vertical pivot post, adjustable track-supporting means mounted on the posts at the ends of said radial arms for varying the degree of inclination of the track, a swinging arm slidably and pivotally connected to said vertical pivot post, a gage plate depending from said arm, a depending vertically adjustable bracket carried by the free end of said swinging arm, and a roller carried by the lower end of said bracket and adapted to roll on the curved track to limit the downward movement of the gage plate.

3. In an apparatus of the class set forth, the combination of a quadrantal frame, a vertical pivot post mounted at the axis of the arc of the frame, a track curved on an arc the center of which is coincident with the axis of the arc of the frame, adjustable supporting means for said track for varying the degree of inclination thereof, a swinging arm pivotally and slidably mounted on the vertical pivot post, a gage plate depending from said swinging arm, means for vertically adjusting the gage plate toward and from the arm, and means carried by the free end of said swinging arm and adapted to engage said track to limit the downward movement of the gage plate.

4. In an apparatus of the class set forth, the combination of a quadrantal frame, a vertical pivot post mounted at the axis of the arc of said frame, a track curved on an arc the axis of which is coincident with the axis of the arc of the frame, adjustable supporting means for said track for varying the degree of inclination thereof, a swinging arm slidably and pivotally mounted on the vertical pivot post, a gage plate depending from said arm, independently adjustable brackets connecting the gage plate with the arm adjacent opposite ends of said gage plate, and means carried by the free end of said arm and adapted to engage said track to limit the downward movement of the gage plate.

5. In an apparatus of the class set forth, the combination of a quadrantal frame, a vertical pivot post mounted at the axis of the arc of said frame, a track curved on an arc the axis of which is coincident with the axis of the arc of the frame, adjustable supporting means for said track for varying the degree of inclination thereof, a swinging arm slidably and pivotally mounted on the vertical pivot post, a gage plate depending from said arm, independently adjustable brackets connecting the gage plate with the arm adjacent opposite ends of said gage plate, means for adjusting the gage plate longitudinally toward and from the pivot post, and means carried by the free end of the arm and adapted to engage said track to limit the downward movement of the gage plate.

6. In an apparatus of the class set forth, the combination of a base, a pivot post mounted thereon, a stationary indicator member curved on an arc the center of which is coincident with the axis of said post, means for varying the degree of inclination of the stationary indicator, a coöperating vertically movable work-engaging indicator member slidably and pivotally mounted on said post, means carried by the free end of said movable indicator adapted to ride upon said curved indicator member to limit the downward movement of the work-engaging indicator.

7. An apparatus for generating the pitch of propeller blades, comprising a relatively stationary member, means for adjustably supporting said member in an inclined position corresponding to the pitch of the blade to be formed, a work-engaging member movable toward and over the surface of the work, and means carried by said work-engaging member and adapted to contact with said stationary member during movement of the work-engaging member over the surface of the work when the work is shaped to the proper pitch.

In testimony whereof I hereunto affix my signature.

ROBERT A. PATRICK.

Copies of this patent may be obtained for five cents each, by addressing the "Commissioner of Patents, Washington, D. C."